July 10, 1934.  B. F. WILLIAMS  1,966,368
HOSE COUPLING AND METHOD OF USING THE SAME
Filed June 13, 1932
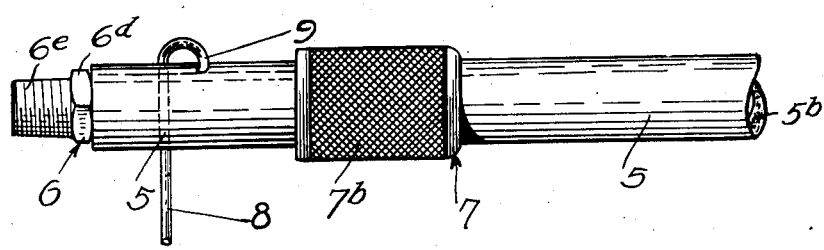
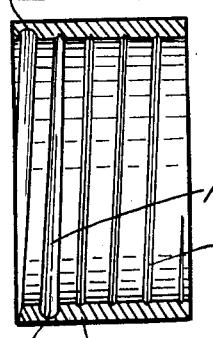
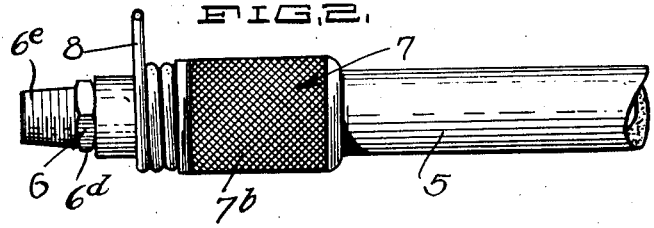
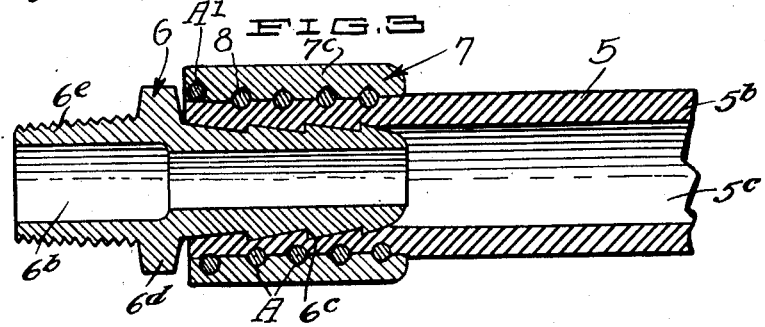
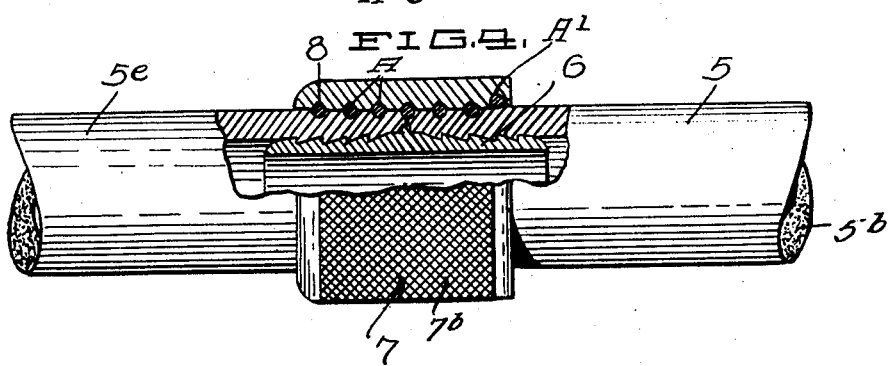
INVENTOR.
BENJAMIN F. WILLIAMS
BY
ATTORNEYS.

Patented July 10, 1934

1,966,368

UNITED STATES PATENT OFFICE 1,966,368

HOSE COUPLING AND METHOD OF USING THE SAME

Benjamin F. Williams., San Francisco, Calif., assignor to Wil-Bro Corporation, San Francisco, Calif., a corporation of California Application June 13, 1932, Serial No. 616,976

6 Claims. (Cl. 285—84)

This invention relates to hose couplings and a method of using the same and has particular reference to a simple, economical, efficient and durable means and method for joining a coupling assembly to a hose.

Hose couplings in general include a member which is inserted into the bore of the hose and is held in position by some form of constricting device encompassing the hose and effective to compress the yielding wall of the hose into firm engagement with the inserted member.

It is an object of my invention generally to improve hose couplings and the method of using the same.

Another object of my invention is to provide a hose coupling which, once applied, is secure against accidental dislodgment and blowing off by high pressure.

An additional object of my invention is to provide a hose coupling which can easily be removed from an installation and is then capable of re-use.

A further object of my invention is to provide a hose coupling which can be installed and removed without the use of tools.

A still further object of my invention is to provide a hose coupling which is usable with different size hoses and with hoses of different wall thickness.

An additional object of my invention is to provide a hose coupling which is smooth in external configuration to avoid possible injury to a user and is symmetrical in external configuration to occupy a minimum of space.

The foregoing and other objects are attained in the embodiment of the invention shown in the drawing, in which—

Figure 1 is a side elevation of a hose coupling of my invention being installed on a hose.

Figure 2 is a side elevation similar to Figure 1 but showing the hose coupling of my invention in a subsequent stage of installation.

Figure 3 is a longitudinal cross-section on a diametral plane of my hose coupling assembled with a hose.

Figure 4 is a side elevation of a modified form of my hose coupling, a portion being broken away on a longitudinal, diametral plane.

Figure 5 is a cross-section on a longitudinal, diametral plane and to an enlarged scale, of the clamp portion of my hose coupling.

The form of my hose coupling which is described herein is especially adapted for use with a tubular hose 5 having a resilient or deformable wall 5b and a generally circular cylindrical bore 5c. The ordinary rubber hose of commerce is an example of this type. In accordance with my invention I preferably provide an insert 6 of relatively nonyielding material, for instance brass, which is provided with an interior through passage 6b to continue the bore of the hose, and is formed externally with peripheral barbs 6c. The barbs are of somewhat greater size than the interior of the hose so that the wall of the hose is deformed when the insert is introduced therein. The natural resilience of the hose wall effects a certain amount of interlocking between the hose and the insert and precludes ready withdrawal of the insert.

As shown in Figure 2, the insert is provided with a non-circular or nut portion $6d$ and with a threaded terminus $6e$ for engagement with any suitable co-operating member. In Figure 4, the insert is shown as symmetrical about a central transverse plane and is adapted for insertion into the bore of a comparable hose $5e$.

In order to augment the inherent interlocking action of the hose wall and the barbs and to afford a sufficiently strong interrelationship between the insert and the hose wall to preclude separation thereof even under high pressures and great stresses, I preferably encompass the hose with a clamp 7 of any suitable material, such as brass. Usually the clamp is circular cylindrical in cross-section and is irregular or roughened as by knurling $7b$ on its outer surface to facilitate turning. The clamp is formed with an uninterrupted, continuous or imperforate wall $7c$ and on its inner surface is provided with a helical groove A which preferably extends from one end of the clamp to the other. The groove A co-operates with a locking element 8 which conveniently is a relatively flexible helix of wire wrapped about the hose. While the element 8 is shown here as a wire, it may also be any suitable compression member that is preformed to the circumference of the hose or is wrapped around the hose with or without especial regard to spacing or degree of tightness.

In accordance with my invention, I prefer that the initial portion $A_1$ of the groove A, that is, the portion adjacent one end of the clamp 7, be of considerable radial depth and that this portion merge gradually as at $A_2$ with the remaining part of the helical groove $A_3$ which is relatively shallow. Preferably, the initial groove portion is at least equal or approximately equal in radial depth to the diameter of the wire 8, while the remaining portion of the groove is about half the diameter of the wire or less in radial depth.

In following the method of my invention in using my hose clamp, the clamp 7 is slipped over the end of the hose and is passed along the hose for a distance somewhat greater than the length of the clamp. During this operation the end of the clamp in which the groove is deep is disposed toward the free end of the hose. Subsequently, the insert 6 is forced into the bore of the hose until at least one or preferably several barbs engage the hose wall. Following this, the wire 8 is positioned around the hose outside of the insert 6. The wire may be preformed into a helix and slipped over the end of the hose, but preferably the wire is a more or less straight piece of suitable length which is wrapped about the hose somewhat at random but with a roughly helical form and with any convenient degree of tightness. To assist in such wrapping action an end of the wire may be provided with a bent or barbed end 9 adapted partially to pierce the hose wall.

When the roughly helical wire is in place, the clamp 7 is moved along the hose to approach the helix and is rotated so that the terminus of the wire helix enters the relatively deep portion $A_1$ of the groove. Since this portion of the groove has a depth substantially greater than the diameter of the wire it has no particular effect to compress or force the wire radially into the hose wall, but is effective in the fashion of a die to arrange the roughly wrapped wire 8 in the form of a regular or true helix entirely comparable to a male thread. Continued screwing or rotation of the clamp causes the progressively shallower or merging portion $A_2$ of the groove gradually to compress or force the wire radially inward into the hose wall where it is held at least partially embedded by the shallow groove portion $A_3$. This reduces the helix diameter and causes the non-compressed end of the wire to lengthen and move around the hose until it all has passed under the clamp. The forces involved usually cause a deformation of the material of the hose wall into very tight and uniform interlocking engagement with the barbs and cause a rather heavy and uniform frictional engagement between the clamp and the wire helix.

Under most conditions it is not necessary to utilize tools, either to rotate the clamp into clamping position or conversely to rotate the clamp in either direction to release the connection. A very tight connection is made simply by the unaided effort of the operator. Since the only part which can in any way be damaged is the wire, the remaining parts are suitable for indefinite re-use and in many cases the wire itself can be re-used repeatedly. For reasonable variations in hose size it is feasible to use the same size insert and clamp and to compensate for any discrepancy in size by using a wire 8 of increased or decreased diameter as the case may be.

As an alternative to the described method of use, the clamp 7, instead of first being positioned upon the hose, can be advanced and rotated onto the hose after the wire has been wound into a roughly helical form. This mode of operation is especially useful when two hoses are to be joined, as illustrated in Figure 4.

It is to be understood that the form of my invention herewith shown and described is to be taken as a preferred example of the same and that various changes may be resorted to without departing from the spirit of the invention or the scope of the subjoined claims.

Having thus described my invention, I claim:—

1. In a hose coupling, a helical member, and a clamp adapted to be screwed upon said member, said clamp having an internal helical groove one portion of which is adapted to receive said member without substantial compression and another portion of which is adapted to compress said member to its maximum depth into the hose wall upon entering said last named portion.

2. A coupling device for soft walled hose comprising a helical clamping wire arranged to be compressed into the exterior surface of said hose, and a binding sleeve threaded over said clamping wire by means of an internal helical groove of substantially uniform depth, but having its end section abruptly enlarged and deepened to provide easy starting and positioning of the wire in said groove.

3. A coupling device for soft walled hose comprising a helical clamping wire arranged to be compressed into the exterior surface of said hose, and a clamp embodying an internally disposed helical groove, the end portion thereof being of a depth to position said locking element, and tapering off smoothly into a continuation of uniformly shallow compression convolutions.

4. A coupling device for soft walled hose comprising a helical clamping wire arranged to be compressed into the exterior surface of the hose, and a binding sleeve threaded over said clamping wire by means of an internal helical groove with the first convolution non-compressing and with the balance of the groove of uniform depth and an inclined surface connecting the two to accomplish the compressing of said wire into the hose wall as the wire emerges from the first convolution.

5. A hose coupling of the character described, the combination with a deformable hose and an insert inserted therein, of a removable coupling clamp mounted on the hose and embodying a helical groove, the initial portion of said groove being of a greater depth than the remaining portion thereof, said remaining portion being of substantially constart depth, and a wire insert adapted to be interposed between said clamp and said hose whereby the clamp acts in its rotation when screwed over and upon the wire, to form the wire into a helix and compress the helix into the hose to retain the insert within the hose.

6. A hose coupling device comprising a helical clamping member and a clamp embodying an internally disposed helical groove adapted to receive the clamping member, the initial convolution of said helical groove being of sufficient diameter to receive the clamping member without substantial compression and tapering off into a plurality of convolutions of lesser uniform diameter.

BENJAMIN F. WILLIAMS.